United States Patent
Yang

(10) Patent No.: US 8,670,892 B2
(45) Date of Patent: Mar. 11, 2014

(54) UNMANNED TRACKLESS ORDER PICKING FORKLIFT SYSTEM

(75) Inventor: Chih-Hsiung Yang, Kaohsiung (TW)

(73) Assignee: National Kaohsiung University of Applied Science, Kaohsiung (TW)

( * ) Notice: Subject to any disclaimer, the term of this patent is extended or adjusted under 35 U.S.C. 154(b) by 92 days.

(21) Appl. No.: 13/219,694

(22) Filed: Aug. 28, 2011

(65) Prior Publication Data

US 2012/0255810 A1  Oct. 11, 2012

(51) Int. Cl.
*B60L 11/00* (2006.01)
*G01C 21/00* (2006.01)
*B66F 9/00* (2006.01)
*B60L 15/00* (2006.01)

(52) U.S. Cl.
USPC ............... 701/25; 701/22; 701/24; 187/222

(58) Field of Classification Search
USPC ................. 701/22, 24, 25; 187/222
See application file for complete search history.

(56) References Cited

U.S. PATENT DOCUMENTS

| | | | |
|---|---|---|---|
| 5,279,672 A * | 1/1994 | Betker et al. | 134/18 |
| 5,938,710 A * | 8/1999 | Lanza et al. | 701/50 |
| 6,484,096 B2 * | 11/2002 | Wong et al. | 701/472 |
| 6,543,591 B2 | 4/2003 | Kuzuya | |
| 6,721,626 B2 | 4/2004 | Tomita et al. | |
| 6,767,175 B2 | 7/2004 | Fujita et al. | |
| 6,799,521 B2 | 10/2004 | Tai et al. | |
| 6,941,200 B2 | 9/2005 | Sonoyama et al. | |
| 7,044,703 B2 | 5/2006 | Fukuda et al. | |
| 7,153,079 B2 | 12/2006 | Miyano et al. | |
| 7,283,890 B2 | 10/2007 | Iijima et al. | |
| 7,460,016 B2 | 12/2008 | Sorenson, Jr. et al. | |
| 2007/0075873 A1 * | 4/2007 | Yang et al. | 340/825.49 |
| 2010/0176922 A1 * | 7/2010 | Schwab et al. | 340/10.1 |

* cited by examiner

*Primary Examiner* — Fadey S Jabr
*Assistant Examiner* — Martin Weeks
(74) *Attorney, Agent, or Firm* — Alan Kamrath; Kamrath IP Lawfirm, P.A.

(57) ABSTRACT

An unmanned trackless order picking forklift system includes a vehicle-driving system, a vehicle-position-adjusting system and a pallet-scanning system each of which is provided in a forklift truck and electrically connected with a CPU device. The vehicle-position-adjusting system is operated to detect a predetermined route so that the CPU device controls the vehicle-driving system to drive the forklift truck along the predetermined route from a first position to a second position. The pallet-scanning system is operated to scan a designated pallet along the predetermined route.

19 Claims, 3 Drawing Sheets

UNMANNED TRACKLESS ORDER PICKING FORKLIFT SYSTEM

BACKGROUND OF THE INVENTION

1. Field of the Invention

The present invention relates to an unmanned trackless order picking forklift system. More particularly, the present invention relates to the unmanned trackless order picking forklift system guided along a fixedly predetermined route.

2. Description of the Related Art

In general, unmanned order picking forklifts are roughly divided into an unmanned trackless type and an unmanned track type according to their driving routes. The unmanned trackless types are further divided into a fixed route type, a semi-fixed route type and an unfixed route type. Furthermore, the unmanned track types are divided into a chain drive trailer and a trolley.

Conventional unmanned vehicles are described in several patents, for example, including U.S. Pat. No. 7,283,890, entitled "Work Convey System, Unmanned Convey Vehicle System, Unmanned Convey Vehicle, and Work Convey Method," U.S. Pat. No. 6,799,521, entitled "Automated Guided Vehicle System," U.S. Pat. No. 7,153,079, entitled "Automated Guided Vehicle," U.S. Pat. No. 7,044,703, entitled "Automated Guided Vehicle, Automated Guided Vehicle System and Wafer Carrying Method," U.S. Pat. No. 6,543,591, entitled "Automated Guided Vehicle System," U.S. Pat. No. 6,721,626, entitled "Wafer Transfer System, Wafer Transfer Method and Automated Guided Vehicle System," U.S. Pat. No. 6,941,200, entitled "Automated Guided Vehicle, Operation Control System and Method for the Same, and Automotive Vehicle" and U.S. Pat. No. 6,799,521, entitled "Automated Guided Vehicle System".

In addition, U.S. Pat. No. 6,767,175, entitled "Forklift" and U.S. Pat. No. 7,460,016, entitled "Radio Frequency Identification (RFID) System for a Forklift" disclose a conventional forklift device which cannot be operated in an unmanned control. However, there exists a need of providing an unmanned trackless order picking forklift guided along a predetermined and fixed route.

The above-mentioned patents are incorporated herein by reference for purposes including, but not limited to, indicating the background of the present invention and illustrating the state of the art.

As is described in greater detail below, the present invention provides an unmanned trackless order picking forklift system. A CPU device controls a vehicle-driving system and a vehicle-position-adjusting system. The vehicle-position-adjusting system is operated to detect a fixedly predetermined route along which to drive the unmanned trackless order picking forklift by the vehicle-driving system in such a way as to mitigate and overcome the above problem.

SUMMARY OF THE INVENTION

The primary objective of this invention is to provide an unmanned trackless order picking forklift system. A CPU device controls a vehicle-driving system for driving and a vehicle-position-adjusting system for detecting a predetermined route. Accordingly, the unmanned trackless order picking forklift system is successful in automatically unmanned driving.

Another objective of this invention is to provide an unmanned trackless order picking forklift system. A CPU device controls a pallet-scanning system for scanning a designated pallet and a lifting system for transporting the designated pallet along a predetermined route. Accordingly, the unmanned trackless order picking forklift system is successful in automatically unmanned transportation.

Another objective of this invention is to provide an unmanned trackless order picking forklift system. A CPU device controls a pallet-scanning system for scanning a designated pallet and a RFID system for identifying the designated pallet. Accordingly, the unmanned trackless order picking forklift system is successful in automatically identifying articles of the designated pallet.

The unmanned trackless order picking forklift system in accordance with an aspect of the present invention includes:

a CPU device provided in a forklift truck;

a vehicle-driving system provided in the forklift truck electrically connected with the CPU device to supply power to drive the forklift truck;

a vehicle-position-adjusting system provided in the forklift truck electrically connected with the CPU device to detect a predetermined route; and a pallet-scanning system provided in the forklift truck electrically connected with the CPU device to scan a designated pallet;

wherein the CPU device controls the vehicle-driving system to drive the forklift truck along the predetermined route from a first position to a second position, and to further scan the designated pallet along the predetermined route.

In a separate aspect of the present invention, the vehicle-driving system includes a digital compass unit.

In a further separate aspect of the present invention, the vehicle-position-adjusting system includes a first infrared detection unit.

In yet a further separate aspect of the present invention, the pallet-scanning system includes a second infrared detection unit.

In yet a further separate aspect of the present invention, the forklift truck further includes a RFID system to identify articles of the designated pallet while scanning.

In yet a further separate aspect of the present invention, the forklift truck further includes a wireless transmission module electrically connected with the CPU device to communicate with a remote computer device.

In yet a further separate aspect of the present invention, the wireless transmission module is selected from a Zigbee wireless transmission module.

In yet a further separate aspect of the present invention, the forklift truck further includes a lifting system for transporting the designated pallet on which to mount the pallet-scanning system.

Further scope of the applicability of the present invention will become apparent from the detailed description given hereinafter. However, it should be understood that the detailed description and specific examples, while indicating preferred embodiments of the invention, are given by way of illustration only, since various modifications will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

It is noted that an unmanned trackless order picking forklift system in accordance with the preferred embodiment of the present invention is suitable for various trackless power lift trucks, trackless forklift reach trucks or other unmanned trackless forklift trucks which are not limitative of the present invention.

Figure 1:
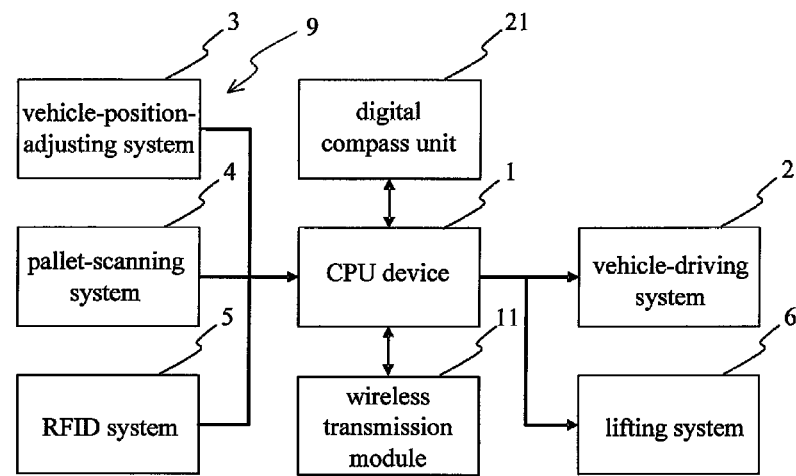
FIG. 1 is a schematic block diagram of an unmanned trackless order picking forklift system in accordance with a preferred embodiment of the present invention.

FIG. 1 shows a schematic block diagram of an unmanned trackless order picking forklift system in accordance with a preferred embodiment of the present invention. Referring to FIG. 1, the unmanned trackless order picking forklift system includes a CPU device 1, a vehicle-driving system 2, a vehicle-position-adjusting system 3, a pallet-scanning system 4, a RFID system 5 and a lifting system 6.

With continued reference to FIG. 1, the vehicle-driving system 2, the vehicle-position-adjusting system 3, the pallet-scanning system 4, the RFID system 5 and the lifting system 6 electrically connect with the CPU device 1. In addition, the CPU device 1 further connects with a wireless transmission module 11 and a digital compass unit 21, and the digital compass unit 21 is correspondingly provided on the vehicle-driving system 2.

Figure 2:
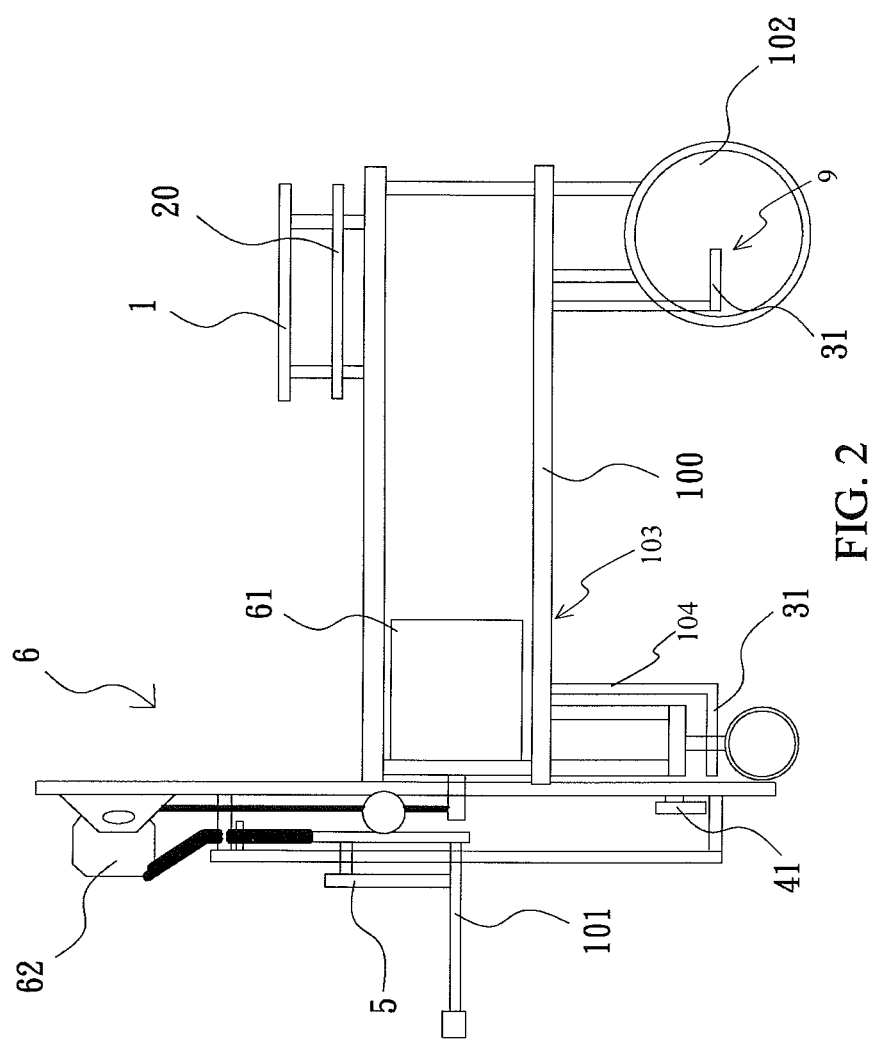
FIG. 2 is a schematic view of a structural construction of the unmanned trackless order picking forklift system in accordance with the preferred embodiment of the present invention.

Turning now to FIG. 2, a schematic view of a structural construction of the unmanned trackless order picking forklift system in accordance with the preferred embodiment of the present invention is shown. The structural construction of the unmanned trackless order picking forklift system includes a forklift truck 100 (including a truck body with an under surface 103), a fork carriage (or pallet-like member) 101 connected with the forklift truck 100, and a plurality of wheels 102 assembled on the forklift truck 100. The fork carriage 101 extends forward from a front portion of the forklift truck 100 and is capable of relatively moving upward and downward with respect to the forklift truck 100. The wheels 102 connect with a bottom of the forklift truck 100 for carrying the weight of the whole system.

Referring again to FIGS. 1 and 2, the CPU device 1 is selected from a series of ATmega microcontrollers commercially available from ATMEL Cooperation in U.S. A preferred controller is ATmega8535L IC or the like. The CPU device 1 and the wireless transmission module 11 are provided on preferred positions of the forklift truck 100.

With continued reference to FIGS. 1 and 2, the vehicle-driving system 2 is also provided on a preferred position of the forklift truck 100 and a drive circuit 20 controls the vehicle-driving system 2 to operate or stop. The vehicle-driving system 2 supplies power to drive the wheels 102 assembled on the forklift truck 100. Furthermore, the vehicle-driving system 2 connects with a digital compass unit 21 for use in calculating a precise location of the forklift truck 100.

For example, the digital compass unit 21 is selected from a TDCM3 chipset produced by Hitachi Cooperation in Japan. The digital compass unit 21 is used to measure the location of the forklift truck 100 and an angle of terrestrial magnetism thereof. The TDCM3 chipset utilizes the angle of terrestrial magnetism to calculate a direction of north to provide directional data to the CPU device 1 and related electronic equipment.

Still referring to FIG. 1, the vehicle-position-adjusting system 3 is also provided on a preferred position of the forklift truck 100 to detect a fixedly predetermined route. By way of example, the predetermined routes connect a standby area, a loading area and an unloading area such that the forklift truck 100 is limited and driven along the predetermined routes.

Referring again to FIGS. 1 and 2, the vehicle-position-adjusting system 3 includes two first infrared detection units 31 each of which is arranged at the front and rear portions of the forklift truck 100 and is mounted on a mounting member 104 which downward extends from the under surface 103 of the truck body, so that the first infrared detection units 31 can detect left-turning or right-turning points on the predetermined routes by the reflection of infrared beams. Accordingly, the unmanned trackless order picking forklift system is successful in guiding the forklift truck 100 along the predetermined routes and will not be deviated therefrom. In another preferred embodiment, the vehicle-position-adjusting system 3 is suitable for other detection methods.

Figure 3:
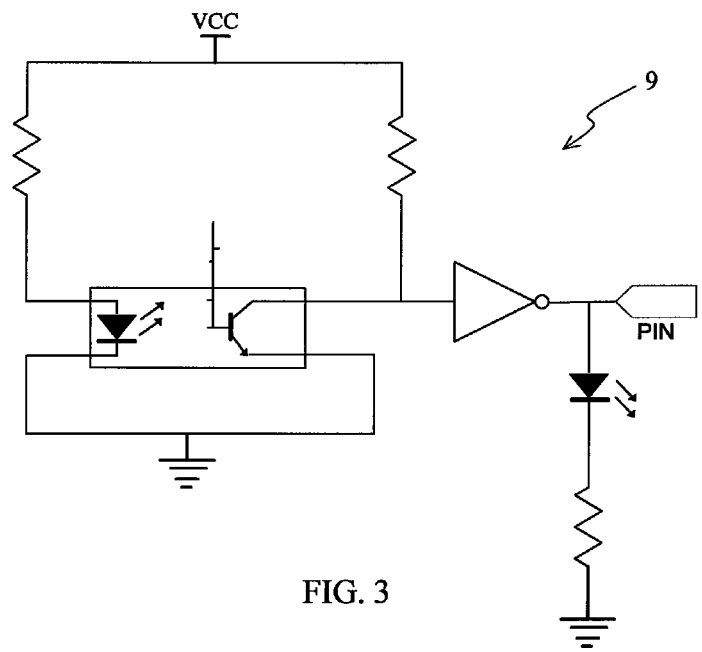
FIG. 3 is a schematic circuitry of an infrared detection unit applied in the unmanned trackless order picking forklift system in accordance with the preferred embodiment of the present invention.

Turning now to FIG. 3, a schematic circuitry of an infrared detection unit applied in the unmanned trackless order picking forklift system in accordance with the preferred embodiment of the present invention is shown. Referring to FIGS. 1 and 3, the vehicle-position-adjusting system 3 utilizes an infrared detection unit 9. When detecting an infrared beam, a receiver end of the infrared detection unit 9 is saturated, and a PIN end outputs a high voltage signal. Conversely, when detecting no infrared beam, the receiver end of the infrared detection unit 9 is cut off, and the PIN end outputs a low voltage signal. Accordingly, the vehicle-position-adjusting system 3 can detect the deviation of the forklift truck 100 from the predetermined routes by the differences of the high and low voltages.

Referring again to FIGS. 1 and 2, the pallet-scanning system 4 is also provided on a preferred position of the forklift truck 100 to detect a designated pallet (not shown). In alternative, the pallet-scanning system 4 is also provided on the fork carriage 101. The pallet-scanning system 4 includes a second infrared detection unit 41 selected from the infrared detection unit 9, as best shown in FIG. 3, and mounted on the front portion of the forklift truck 100.

Still referring to FIGS. 1 and 2, the RFID system 5 is also provided on a preferred position of the forklift truck 100 (e.g. a front end of the fork carriage 101) to read a RFID tag. For example, the RFID system 5 is selected from a RFID reader produced by PlayRobot Inc. in Taiwan.

Still referring to FIGS. 1 and 2, the lifting system 6 is also provided on a preferred position of the forklift truck 100 to drive the fork carriage 101 relatively moving upward and downward with respect to the forklift truck 100. In a preferred embodiment, the lifting system 6 includes a motor unit 61 and a wheel set 62 which mechanically connect with the fork carriage 101 for controlling mechanical movements.

Referring back to FIG. 1, the wireless transmission module 11 is electrically connected with the CPU device 1 to communicate with a remote computer device (i.e. personal computer, not shown). For example, the wireless transmission module 11 is selected from a Zigbee wireless transmission module under Zigbee protocols. The remote computer device provides a monitoring system via a RS-232 interface to communicate with the Zigbee wireless transmission module for transmitting commands or accessing data to the forklift truck 100.

With continued reference to FIG. 1, a programming panel is operated to scan information of the predetermined routes and designated pallets input from a keyboard and to display on a LCD device. The commands input from the programming panel are sent to the CPU device 1 by the Zigbee technology via the wireless transmission module 11 and are further sent to the remote computer device by the RS-232 protocol. Alternatively, the commands input from the remote computer device are sent to the programming panel by the RS-232 protocol and are further sent to the CPU device 1 by the Zigbee technology via the wireless transmission module 11.

Figure 4:
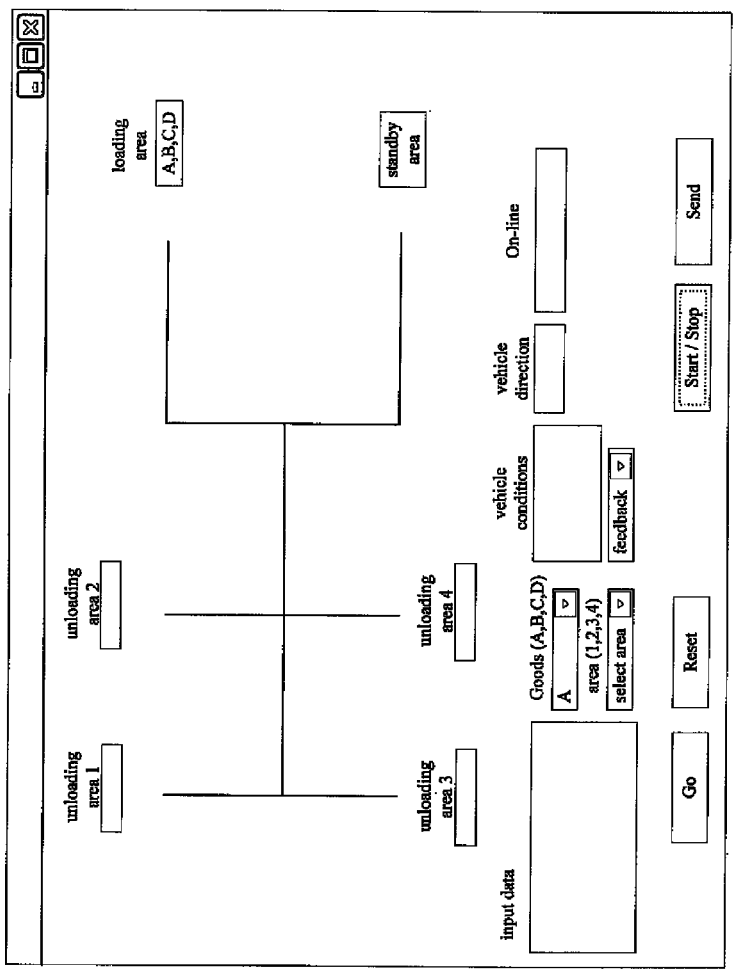
FIG. 4 is a schematic view of a human-machine interface applied in the unmanned trackless order picking forklift system in accordance with the preferred embodiment of the present invention.

Turning now to FIG. 4, a schematic view of a human-machine interface applied in the unmanned trackless order picking forklift system in accordance with the preferred embodiment of the present invention is shown. The human-machine interface, as best shown in FIG. 4, is written by Visual BasicF (VB) or other programming languages to provide a VB monitoring system for controlling the forklift truck 100.

Although the invention has been described in detail with reference to its presently preferred embodiment(s), it will be understood by one of ordinary skill in the art that various modifications can be made without departing from the spirit and the scope of the invention, as set forth in the appended claims.

What is claimed is:

1. An unmanned trackless order picking forklift system comprising:
   a CPU device provided in a forklift truck;
   a vehicle-driving system provided in the forklift truck electrically connected with the CPU device to supply power to drive the forklift truck;
   a vehicle-position-adjusting system provided in the forklift truck and electrically connected with the CPU device, with the vehicle-position-adjusting system detecting a predetermined route; and
   a pallet-scanning system provided in the forklift truck and electrically connected with the CPU device to scan a designated pallet; wherein the CPU device controls the vehicle-driving system to drive the forklift truck along the predetermined route detected by the vehicle-position-adjusting system from a first position to a second position and to further scan the designated pallet along the predetermined route, wherein the vehicle-position-adjusting system includes a first infrared detection unit detecting at least one turning point provided in the predetermined route by reflection of infrared beams.

2. The unmanned trackless order picking forklift system as defined in claim 1, wherein the vehicle-driving system includes a digital compass unit.

3. The unmanned trackless order picking forklift system as defined in claim 1, wherein the pallet-scanning system includes a second infrared detection unit.

4. The unmanned trackless order picking forklift system as defined in claim 1, wherein the forklift truck further includes a RFID system to identify articles of the designated pallet while scanning.

5. The unmanned trackless order picking forklift system as defined in claim 1, wherein the forklift truck further includes a wireless transmission module electrically connected with the CPU device to communicate with a remote computer device.

6. The unmanned trackless order picking forklift system as defined in claim 5, wherein the wireless transmission module is selected from a Zigbee wireless transmission module.

7. The unmanned trackless order picking forklift system as defined in claim 1, wherein the forklift truck further includes a lifting system for transporting the designated pallet on which to mount the pallet-scanning system.

8. An unmanned trackless order picking forklift comprising:
   a forklift truck;
   a first infrared detection unit provided in the forklift truck, with the first infrared detection unit detecting a predetermined route, with the first infrared detection unit detecting at least one turning point provided in the predetermined route by reflection of infrared beams;
   a fork carriage connected with the forklift truck; and
   a second infrared detection unit provided on the fork carriage to scan a designated pallet;
   wherein the forklift truck is driven along the predetermined route detected by the first infrared detection unit from a first position to a second position and to further scan the designated pallet along the predetermined route.

9. The unmanned trackless order picking forklift as defined in claim 8, wherein a vehicle-driving system includes a digital compass unit.

10. The unmanned trackless order picking forklift as defined in claim 8, wherein the first infrared detection unit is arranged at a front portion or a rear portion of the forklift truck.

11. The unmanned trackless order picking forklift as defined in claim 8, wherein the second infrared detection unit is mounted on a front portion of the forklift truck.

12. The unmanned trackless order picking forklift as defined in claim 8, wherein the forklift truck further includes a RFID system mounted on an end of the fork carriage to identify articles of the designated pallet.

13. The unmanned trackless order picking forklift as defined in claim 8, wherein the forklift truck further includes a wireless transmission module to communicate with a remote computer device.

14. The unmanned trackless order picking forklift as defined in claim 13, wherein the wireless transmission module is selected from a Zigbee wireless transmission module.

15. The unmanned trackless order picking forklift as defined in claim 9, wherein the forklift truck further includes a lifting system for transporting the designated pallet.

16. The unmanned trackless order picking forklift as defined in claim 8 further comprising a second infrared detection unit provided in the forklift, with the second infrared detection unit detecting at least another turning point provided in the predetermined route opposite to the at least one turning point and by reflection of infrared beams.

17. The unmanned trackless order picking forklift system as defined in claim 1 wherein the vehicle-position-adjusting system further comprises a second infrared detection unit provided in the forklift, with the second infrared detection unit detecting at least another turning point provided in the predetermined route opposite to the at least one turning point and by reflection of infrared beams.

18. The unmanned trackless order picking forklift as defined in claim 8 wherein the vehicle-position-adjusting system includes a mounting member and the first infrared detection unit mounted thereon.

19. The unmanned trackless order picking forklift system as defined in claim 1 wherein the vehicle-position-adjusting system includes a mounting member and the first infrared detection unit mounted thereon.

* * * * *